(12) United States Patent
Dockery

(10) Patent No.: US 11,083,291 B2
(45) Date of Patent: Aug. 10, 2021

(54) CAP RACK

(71) Applicant: Bryan William Dockery, Round Rock, TX (US)

(72) Inventor: Bryan William Dockery, Round Rock, TX (US)

( * ) Notice: Subject to any disclaimer, the term of this patent is extended or adjusted under 35 U.S.C. 154(b) by 0 days.

(21) Appl. No.: 16/808,544

(22) Filed: Mar. 4, 2020

(65) Prior Publication Data

US 2020/0281354 A1    Sep. 10, 2020

Related U.S. Application Data

(60) Provisional application No. 62/815,039, filed on Mar. 7, 2019.

(51) Int. Cl.
| | | |
|---|---|---|
| *A47B 81/00* | (2006.01) | |
| *G01N 35/00* | (2006.01) | |
| *B01L 9/06* | (2006.01) | |

(52) U.S. Cl.
CPC .............. *A47B 81/00* (2013.01); *B01L 9/06* (2013.01); *G01N 35/00* (2013.01); *B01L 2300/0609* (2013.01); *G01N 2035/00287* (2013.01)

(58) Field of Classification Search
CPC ... A47B 81/00; A47B 2097/003; A47B 47/04; A47B 2037/005; G01N 35/00; G01N 2035/0405; G01N 2035/00287; B25H 3/04; A63B 71/0036; B01L 3/561; B01L 2300/0609; B01L 2300/04; B01L 9/06; F21V 21/088; F21V 21/0885
See application file for complete search history.

(56) References Cited

U.S. PATENT DOCUMENTS

| | | | | |
|---|---|---|---|---|
| 1,670,204 | A | * | 5/1928 | Moore ................. G09F 5/042 206/372 |
| D190,407 | S | * | 5/1961 | Tauscher ................ D6/528 |
| 3,304,039 | A | * | 2/1967 | Edelman ............... A47K 1/09 248/108 |
| 3,520,988 | A | * | 7/1970 | Ballock, Sr. .......... H02G 11/02 174/135 |
| 3,698,563 | A | * | 10/1972 | Gordon ................ A63B 60/60 211/85.7 |
| 3,739,917 | A | * | 6/1973 | Okutani ................ A47F 7/17 211/40 |
| 3,990,755 | A | * | 11/1976 | Krause ................. A47K 5/18 312/207 |
| D259,314 | S | * | 5/1981 | Nordlund .............. D6/569 |

(Continued)

*Primary Examiner* — Ko H Chan
(74) *Attorney, Agent, or Firm* — Philip S. Hof

(57) ABSTRACT

A rack to be suspended from a support structure includes a hook portion, an upright portion, and a shelf. The hook portion defines a cavity configured to receive an upper edge of a wall of the support structure therein. The upright wall is connected to and extends from the hook portion. The shelf is connected to the upright wall at a location spaced apart from the hook portion along a height of the upright wall. The shelf projects outward from the upright wall to a distal edge of the shelf that is spaced apart from the upright wall. The shelf defines a plurality of slots through the thickness of the shelf. The slots are open along the distal edge and are configured to accommodate one or more of multiple reclosable container caps or multiple tubes connected to the reclosable container caps.

10 Claims, 5 Drawing Sheets

(56) References Cited

U.S. PATENT DOCUMENTS

| | | | | |
|---|---|---|---|---|
| 4,343,172 A * | 8/1982 | Nordlund | | B25H 3/04 |
| | | | | 72/339 |
| 4,365,720 A * | 12/1982 | Kaneshiro | | B25H 3/006 |
| | | | | 211/70.6 |
| 4,446,972 A * | 5/1984 | Sussman | | A47G 29/08 |
| | | | | 211/26 |
| 4,488,327 A * | 12/1984 | Snider | | A46B 5/00 |
| | | | | 15/111 |
| D279,640 S * | 7/1985 | Walbeck | | D6/536 |
| 4,681,233 A * | 7/1987 | Roth | | B25H 3/04 |
| | | | | 211/70.6 |
| D340,609 S * | 10/1993 | Hubbard | | D6/567 |
| 5,313,858 A * | 5/1994 | Stitt | | B01L 3/5082 |
| | | | | 422/914 |
| 5,386,915 A * | 2/1995 | Sirhan | | B25H 3/04 |
| | | | | 211/13.1 |
| 5,472,164 A * | 12/1995 | Contee, Jr. | | A47J 37/0786 |
| | | | | 126/25 R |
| 5,485,931 A * | 1/1996 | Barr, Jr. | | A47F 5/08 |
| | | | | 211/60.1 |
| D372,827 S * | 8/1996 | Roche | | D6/567 |
| 5,566,842 A * | 10/1996 | Dennis | | A47K 1/09 |
| | | | | 211/65 |
| D393,543 S * | 4/1998 | Wilkening | | D3/313 |
| 6,484,892 B1 * | 11/2002 | Gooner | | B25H 3/04 |
| | | | | 211/70.6 |
| D482,261 S * | 11/2003 | Kobayashi | | D8/349 |
| 6,769,553 B1 * | 8/2004 | Hurt | | A47F 7/0028 |
| | | | | 211/60.1 |
| 6,893,393 B2 * | 5/2005 | Carrillo | | A61M 25/02 |
| | | | | 600/104 |
| 7,464,907 B1 * | 12/2008 | Lane | | A47K 1/09 |
| | | | | 211/75 |
| 7,909,181 B2 * | 3/2011 | Purushothaman | | A47L 15/503 |
| | | | | 211/41.8 |
| D790,249 S * | 6/2017 | Park | | D6/540 |
| 10,575,625 B2 * | 3/2020 | Senn | | A45F 5/021 |
| 10,729,314 B2 * | 8/2020 | Kudo | | A61B 1/00137 |
| 10,834,870 B2 * | 11/2020 | Wagner | | A01D 34/64 |
| 2007/0210021 A1 * | 9/2007 | Whitehead | | B25H 3/04 |
| | | | | 211/70.6 |

* cited by examiner

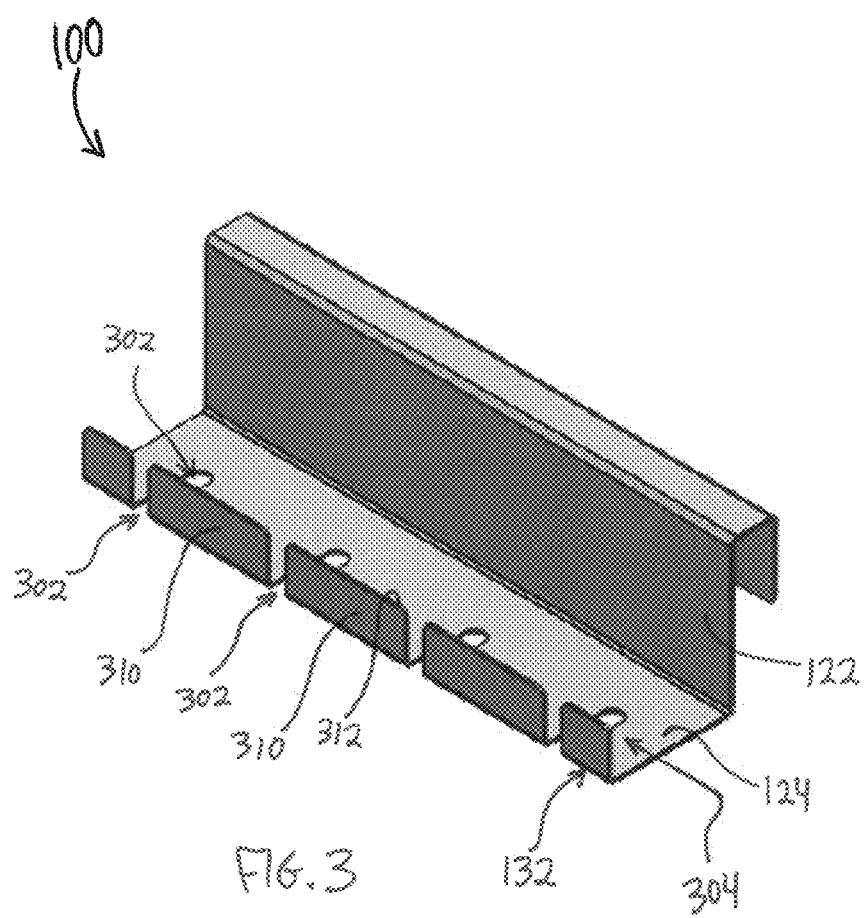

ically relates generally to hanging
CAP RACK

CROSS-REFERENCE TO RELATED APPLICATIONS

This application is a non-provisional conversion of, and claims the benefit of, U.S. Provisional Application 62/815,039, filed on Mar. 7, 2019, which is incorporated by reference herein in its entirety.

BACKGROUND

The subject matter herein relates generally to hanging storage devices or racks for supporting one or more objects, such as reclosable container caps.

Some analytical chemistry technologies, such as liquid chromatography for example, utilize bottles for storing different liquid contents, such as multiple mobile phases having different compositions. The bottles are sealed via reclosable caps. The caps may have tubes extending through the caps to provide access to the contents through the tubes while the caps are in a closed position mounted on the bottles. Over a period of time in a lab, an analytical chemist may remove the cap of a given bottle to add contents to bottle, stir the contents, remove the contents and clean out the bottle, and/or the like. While performing such tasks with the bottle, the chemist may set the cap down to free both of the chemist's hands for manipulating the bottle (e.g., pouring, stirring, cleaning, etc.). The chemist may set the cap down on a flat work space, such as a table, a counter, or the flat top of a machine, such as a liquid chromatography detector machine. At any given time, the chemist may have multiple bottles of solutions located in the work space of the chemist, with any number of these bottles having the respective caps removed and set on the flat work space.

However, this practice of temporarily setting caps on flat work spaces has several undesirable consequences. The chemist may accidentally switch or mix-up the caps with respect to the associated bottles, which has the potential to disrupt or even ruin a chemical analysis or experiment. For example, because the caps may have tubes therethrough that are attached to different ports of a machine, such as a liquid chromatography detector, mixing up the caps could cause the machine to draw the contents of the wrong bottle during the analysis, rendering the results of the analysis invalid. Accidentally switching the caps and drawing from the wrong bottle could contaminate both the line and the contents of the bottle. Furthermore, placing the caps on a non-sterile surface, such as a flat work space, could introduce external contaminants onto the caps (such as dirt, dust, liquids, etc.) which may then be transferred to the contents of the bottles upon reapplying the caps to the bottles. The presence of the contaminants in the contents may introduce errors that reduce the accuracy of the analysis. In addition, the practice of setting removed caps down on any open areas of a flat work space may generally result in a cluttered work space and reduced work efficiency due to lost time spent looking for a place to set caps and looking for specific caps that were previously set down.

SUMMARY

In one or more embodiments, a rack to be suspended from a support structure is provided. The rack includes a hook portion, an upright portion, and a shelf. The hook portion defines a cavity configured to receive an upper edge of a wall of the support structure therein. The upright wall is connected to and extends from the hook portion. The shelf is connected to the upright wall at a location spaced apart from the hook portion along a height of the upright wall. The shelf projects outward from the upright wall to a distal edge of the shelf that is spaced apart from the upright wall. The shelf defines a plurality of slots through the thickness of the shelf. The slots are open along the distal edge and are configured to accommodate one or more of multiple reclosable container caps or multiple tubes connected to the reclosable container caps.

In one or more embodiments, a rack to be suspended from a support structure is provided. The rack includes a hook portion, an upright wall, and a shelf. The hook portion includes a shoulder and lip. The upright wall is connected to and extends from the shoulder of the hook portion. The upright wall and the lip laterally define a cavity bounded above by the shoulder. The cavity is configured to receive an upper edge of a wall of the support structure therein. The shelf is connected to the upright wall at a location below the hook portion. The shelf projects outward from the upright wall to a distal edge of the shelf that is spaced apart from the upright wall. The shelf defines a plurality of slots through a thickness of the shelf. The slots are open along the distal edge and are configured to accommodate one or more of multiple reclosable container caps or multiple tubes connected to the reclosable container caps. The shelf includes multiple tabs projecting upward from the distal edge of the shelf. Adjacent tabs are separated from each other by a corresponding one of the slots.

BRIEF DESCRIPTION OF THE DRAWINGS

FIG. 3 is a perspective view of the cap rack according to a second embodiment.

DETAILED DESCRIPTION

Figure 1:
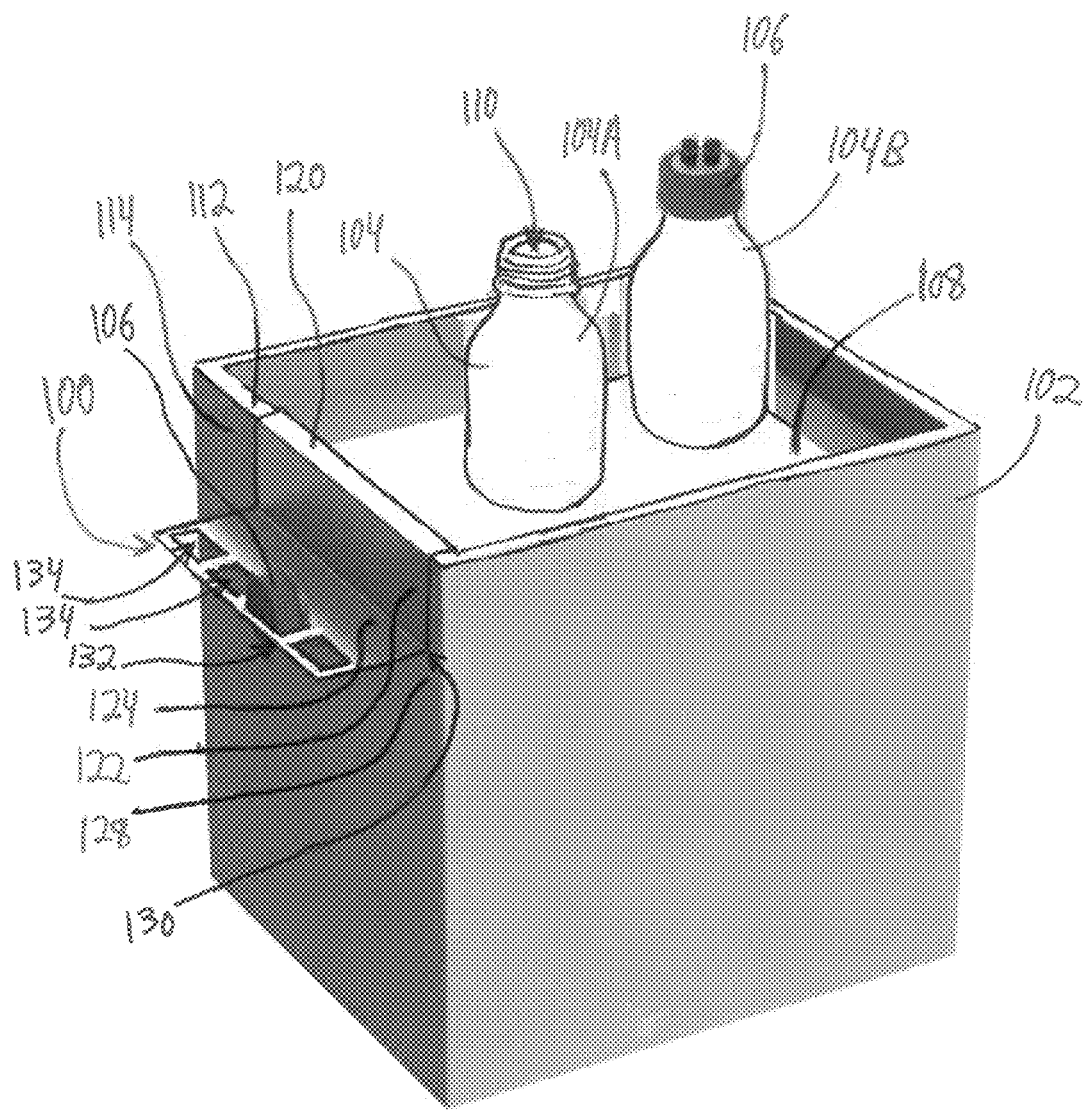
FIG. 1 is a perspective view of a cap rack mounted on a support structure according to an embodiment.

FIG. 1 is a perspective view of a cap rack 100 mounted on a support structure 102 according to an embodiment. FIG. 1 also shows two containers 104 disposed on a platform 108 of the support structure 102. The containers 104 may be used to store contents (e.g., solutions) for analytical chemistry. In a non-limiting example, the contents of the containers 104 can include high performance and ultra-high performance subspecies for liquid chromatography. The cap rack 100 is configured to at least temporarily hold and support reclosable container caps 106 of the containers 104. The reclosable container caps 106 are used to seal openings 110 of the containers 104 when the caps 106 are fully mounted to the containers 104 in a closed state. As used herein, the containers 104 are referred to as bottles, and the reclosable container caps 106 are referred to as caps.

The caps 106 may be selectively removed from the bottles 104 by a human or machine to gain access the interior of the bottles 104, such as to add contents to the bottles 104, stir the contents in the bottles 104, clean the bottles 104, remove contents from the bottles 104, and/or the like. The caps 106 optionally may be screw caps that have helical threads that engage complementary threads on the bottles 104. The cap rack 100 is designed to hold the caps 106 in an organized arrangement which reduces the risk of mixing up the caps 106 on the bottles 104 and reduces potential contamination from external contaminants. For example, the known practice of setting the caps 106 down directly on a flat work space, such as a table, counter, the platform 108 of the support structure 102, or the like, can introduce external contaminants such as dirt, dust, bacteria, and the like into the contents of the bottles 104.

The cap rack 100 in the illustrated embodiment is suspended from an upper edge 112 of a side wall 114 of the support structure 102. The cap rack 100 in FIG. 1 holds a single cap 106 that was removed from a first bottle 104A of the two bottles 104 on the platform 108. The cap 106 associated with the second bottle 104B is mounted on the second bottle 104B. The cap 106 on the rack 100 mechanically contacts the rack 100 (and only the rack 100) and is supported at a height above the floor or ground on which the support structure 102 is located.

The cap rack 100 includes a hook portion 120, an upright wall 122, and a shelf 124. The hook portion 120 is used to mount the rack 100 to the support structure 102. The hook portion 120 defines a cavity 126 (shown in FIG. 2) that receives the upper edge 112 of the side wall 114 therein. The upright wall 122 is connected to the hook portion 120 and extends from the hook portion 120 to the shelf 124. The upright wall 122 extends along the side wall 114 and may abut against an outer surface 128 of the side wall 114. The shelf 124 is connected to the upright wall 122 at a location that is spaced apart from the hook portion 120 along a height of the upright wall 122. In a non-limiting example, the hook portion 120 may be connected to a top end or edge of the upright wall 122, and the shelf 124 may be connected to a bottom end or edge of the upright wall 122. The shelf 124 projects outward from the upright wall 122 in a direction away from the outer surface 128 of the side wall 114. The shelf 124 is cantilevered from the upright wall 122. For example, the shelf 124 extends from a fixed edge 130 of the shelf 124 at the upright wall 122 to a distal edge 132 of the shelf 124 that is laterally spaced apart from the upright wall 122. The shelf 124 defines a plurality of apertures 134 through a thickness of the shelf 124. The apertures 134 are sized, shaped, and arranged to receive and support multiple reclosable container caps 106.

Figure 2:
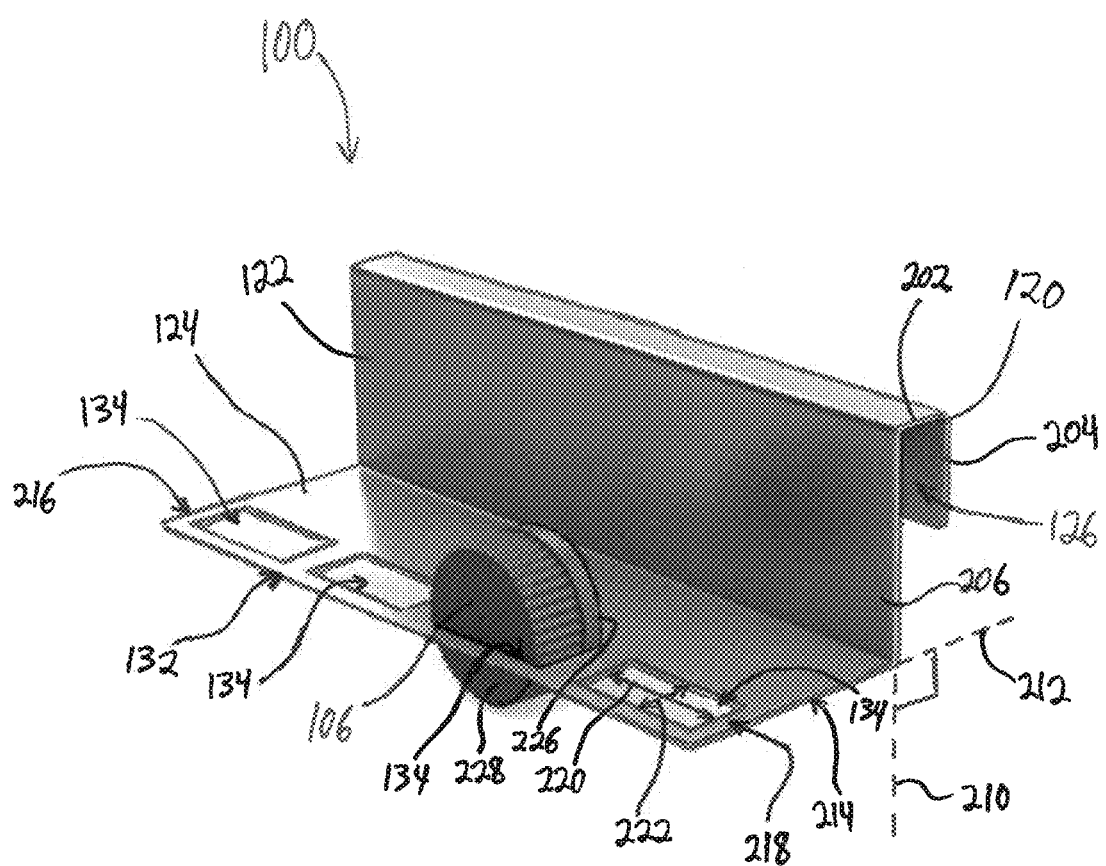
FIG. 2 is an isolated perspective view of the cap rack shown in FIG. 1.

FIG. 2 is an isolated perspective view of the cap rack 100 shown in FIG. 1. In the illustrated embodiment, the hook portion 120 includes a shoulder 202 and a lip 204. The shoulder 202 is connected to both the upright wall 122 and the lip 204. The shoulder 202 is disposed between the upright wall 122 and the lip 204. The shoulder 202 is configured to engage (e.g., in physical contact) the upper edge 112 (shown in FIG. 1) of the side wall 114. The lip 204 is configured to engage and inner surface of the side wall 114, which is opposite the outer surface 128 (shown in FIG. 1). The cavity 126 is laterally defined between the upright wall 122 and the lip 204. The shoulder 202 defines a closed top end of the cavity 126. The cavity 126 is open along a bottom end thereof to receive the side wall 114 into the cavity 126.

In an embodiment, the hook portion 120, the upright wall 122, and the shelf 124 are integrally connected to one another and define a unitary, monolithic (e.g., one-piece) body 206. For example, the interfaces between the different components of the rack 100 may be seamless. The rack 100 can be produced by stamping and forming a metal sheet or panel. For example, the shelf 124 may be formed by bending a metal sheet out of the plane of the upright wall 122. The components of the rack 100 may be relatively thin. For example, the shelf 124 and the upright wall 122 may be panels having respective thicknesses less than 5 mm, such as 1 mm, 2 mm, 3 mm, or the like. In an alternative embodiment, the rack 100 may be formed by welding, molding, extruding, or the like. Optionally, the rack 100 may be composed of one or more materials other than metal, such as a plastic material or a composite material.

In the illustrated embodiment, the shelf 124 and the upright wall 122 are both planar. For example, the upright wall 122 extends along a respective upright axis 210, and the shelf 124 extends along a respective shelf axis 212. The shelf axis 212 may be perpendicular to the upright axis 210, such that the shelf 124 is oriented perpendicular to the upright wall 122. Alternatively, the shelf 124 may be oriented at an oblique angle relative to the upright wall 122, such that shelf 124 is transverse to the upright wall 122 but not perpendicular thereto. The shoulder 202 of the hook portion 120 optionally may be parallel to the shelf 124 and perpendicular to the upright wall 122. The lip 204 of the hook portion 120 may be perpendicular to the shoulder 202 and parallel to the upright wall 122.

The shelf 124 extends a width from the upright wall 122 to the distal edge 132 thereof. The shelf 124 extends a length (perpendicular to the width) between a first end 214 and a second end 216 of the shelf 124. The second end 216 is opposite the first end 214. In the illustrated embodiment, the apertures 134 of the shelf 124 are arranged side-by-side in a row 218 along the length of the shelf 124. Therefore, the rack 100 is configured to hold multiple caps 106 spaced apart along the row 218. Although only one row 218 is shown in the illustrated embodiment, the shelf 124 of the rack 100 may define two or more rows in alternative embodiment for accommodating more caps 106.

In the illustrated embodiment, the apertures 134 have rectangular shapes. For example, each aperture 134 has a perimeter defined by four linear edges including two parallel pairs of edges. One of the pairs has a longer length than the other pair. The length of the longer pair of parallel edges defines a long dimension 220 of the aperture 134, and the length of the shorted pair of parallel edges defines a short dimension 222 of the aperture 134. In an embodiment, the apertures 134 are sized relative to the caps 106 configured to be received therein. For example, the long dimension 220 is sized less than a diameter of the cap 106, which prevents the cap 106 from falling through the aperture 134. The long dimension 220 may be greater than the radius (or half the diameter) of the cap 106 to ensure that a sufficient amount of the cap 106 extends through the aperture 134 to retain the cap 106 in the aperture 134 without the cap 106 unintentionally falling out of the aperture 134. The short dimension 222 may be sized greater than a height of the corresponding cap 106, which is defined from a bottom end 226 of the cap to a top end 228 of the cap. The bottom end 226 is open, and the top end 228 is closed for sealing the corresponding bottle 104 (shown in FIG. 1). The short dimension 222 is greater than the height of the cap to allow the cap to enter into the aperture 134 in the orientation shown in FIGS. 1 and 2. In the illustrated orientation, a central axis of the cap 106 is parallel (or approximately parallel within a tolerance margin of 3%, 5%, or the like) to the shelf axis 212.

The rack 100 optionally may include indicia, such as markings, symbols, reference numbers, labels, or the like, associated with the apertures 134 for identifying the apertures 134. The indicia may be disposed on the shelf 124 and/or on the upright wall 122 and may be located at designated positions to indicate which aperture 134 the respective indicia identifies. The indicia may be used to distinguish between multiple caps 106 placed on the rack 100 to prevent, or at least prohibit, misplacing a cap 106 from the rack 100 by reapplying the cap 106 on the wrong bottle 104.

Figure 6:
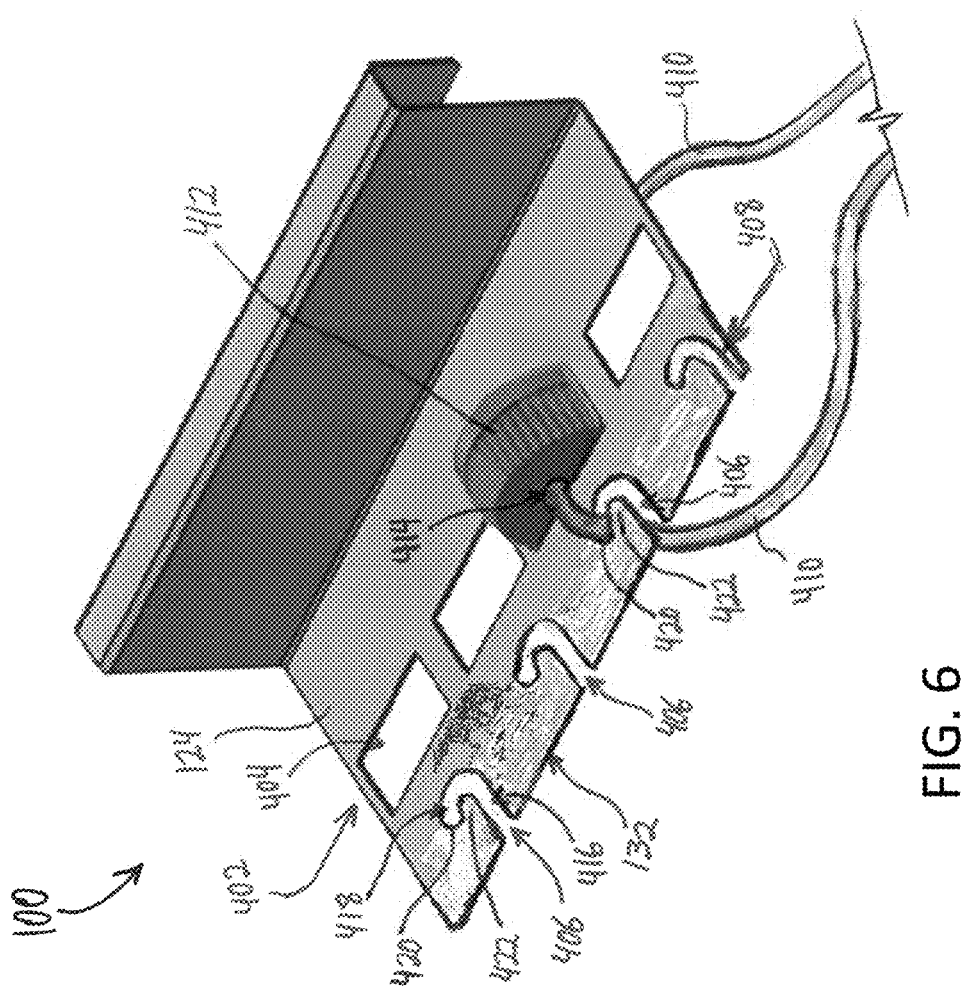
FIG. 6 is a perspective view of the cap rack according to a third embodiment.

FIG. 3 is a perspective view of the cap rack 100 according to a second embodiment. In the illustrated embodiment, the shelf 124 defines multiple apertures 302 through the thickness of the shelf 124. The apertures 302 are arranged in a row 304 and configured to receive and support multiple reclosable container caps 106, like the apertures 134 shown in FIGS. 1 and 2. The apertures 302 have different shapes and positions than the apertures 134 shown in FIGS. 1 and 2. For example, the apertures 302 in the illustrated embodiment are slots that are open along the distal edge 132 of the shelf 124. The slots 302 may extend parallel to each other towards the upright wall 122. The slots 302 do not extend fully to the upright wall 122 in the illustrated embodiment, but in an alternative embodiment may extend to the upright wall 122. The slots 302 are spaced apart from each other a designated distance along the length of the shelf 124. The slots 302 may be sized to accommodate side walls of the container caps 106 and/or tubes connected to the caps 106, as shown in FIG. 6 for example. For example, the designated distance may be less than the diameter of the caps 106 to enable the cylindrical side wall of a given cap to be received into two adjacent slots 302 (at the same time) for supporting the cap. For example, the caps 106 received in the slots 302 may have the same orientation as the cap 106 shown in FIG. 2. The cap rack 100 can be used to support caps 106 in multiple different arrangements as desired by the user, such as by inserting the side walls of the caps 106 into the slots 302 or placing the caps 106 on top of the shelf 124, as shown in FIG. 4.

In the illustrated embodiment, the rack 100 includes tabs 310 that project upward from the distal edge 132 of the shelf 124. The tabs 310 are located between the slots 302. The edges 312 of the tabs 310 may engage interior surfaces of the caps 106 that are received in the slots 302. Furthermore, the upturned tabs 310 may be used like hooks to suspend other items from the shelf 124 of the rack 100, such as tubes, lanyards, goggles, and/or the like, and block loose items disposed on the shelf 124 from falling off the distal edge 132.

Figure 5:
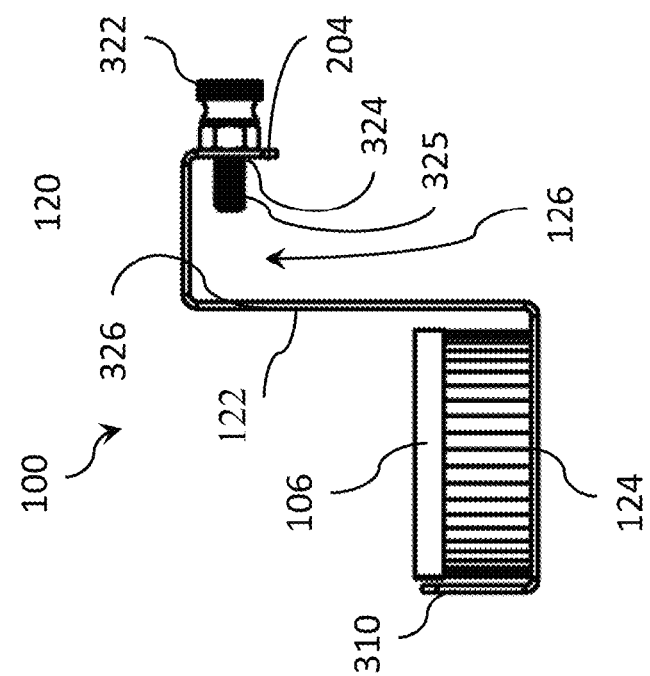
FIG. 5 is a side view of the cap rack shown in FIG. 4.
Figure 4:
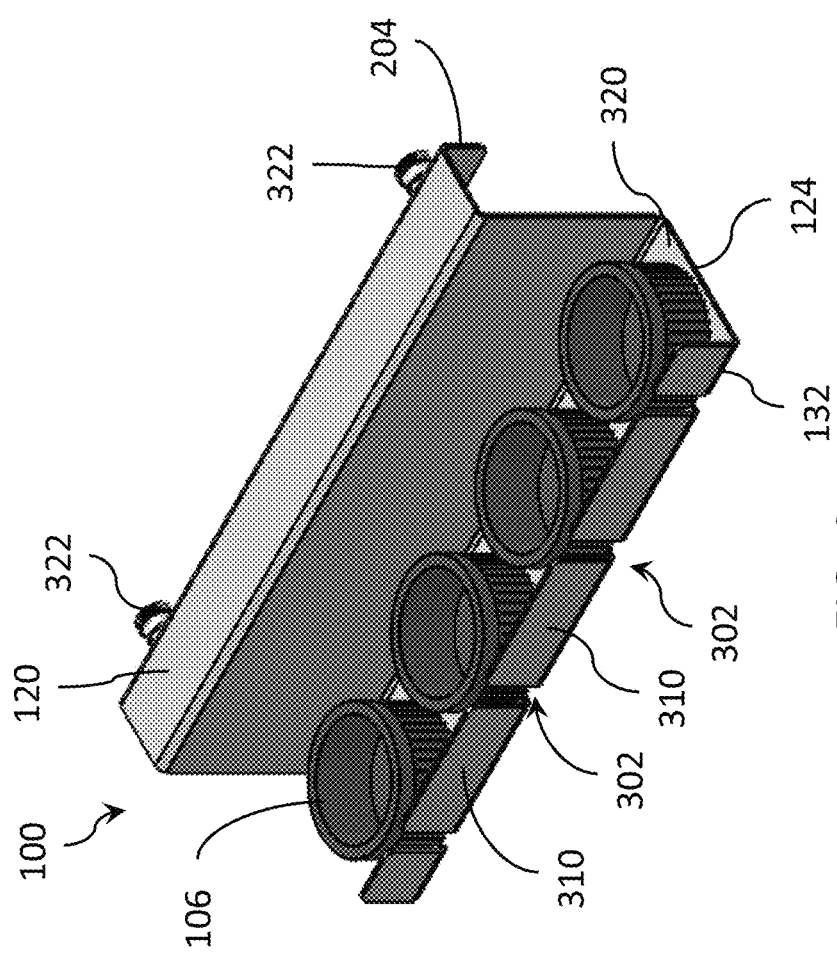
FIG. 4 is a perspective view of the cap rack shown in FIG. 3 holding four reclosable container caps.

FIG. 4 is a perspective view of the cap rack 100 shown in FIG. 3 holding four reclosable container caps. FIG. 5 is a side view of the cap rack 100 shown in FIG. 4. In FIG. 4, the four caps 106 are disposed on a top surface 320 of the shelf 124. If any caps 106 are coupled to a tube that extends through a top wall of the cap 106, the tube can be inserted into a corresponding slot 302 through the distal edge 132 of the shelf 124. Accommodating the tubes and other elements connected to the caps 106, via the slots 302, enables the caps 106 to lay on the top surface 320 and/or the tabs 310 without interference.

Optionally, the lip 204 of the hook portion 120 includes one or more fitting elements 322 that assist in stabilizing and securing the cap rack 100 to the support structure 102. The fitting elements 322 project from an inner surface 324 of the lip into the cavity 126. The fitting elements 322 can represent or include fasteners, compressive pads, rubber or rubber-like grip-enhancing textures, clamps, or the like. The fasteners can include screws, clips, and the like. The compressive pads and/or grip-enhancing textures can be secured, via adhesive or the like, to the inner surface 324 of the lip 204 facing towards the upright wall 122 and/or an inner surface 326 of the upright wall 122 facing towards the lip 204. In the illustrated embodiment, the fitting elements 322 are thumbscrews coupled to the lip 204. The thumbscrews can be selectively rotated to vary the length of a screw shaft 325 projecting into the cavity 126 to engage and force the wall into physical contact with the upright wall 122. The fitting elements 322 can couple to the portion of the support structure within the cavity 126 by providing a friction fit.

FIG. 6 is a perspective view of the cap rack 100 according to a third embodiment. The rack 100 in FIG. 6 has a row 402 of rectangularly-shaped apertures 404 defined through the shelf 124, similar to the embodiment shown in FIGS. 1 and 2. In the illustrated embodiment, the shelf 124 also defines a plurality of slots 406 through the thickness of the shelf 124. The slots 406 are spaced apart from the apertures 404. The slots 406 are arranged in a row 408 that is closer to the distal edge 132 of the shelf 124 than the proximity of the apertures 404 to the distal edge 132. Each slot 406 may be open along the distal edge 132 and sized to receive a corresponding tube 410 that is connected to a reclosable container cap 412. For example, the cap 412 that is shown in FIG. 6 defines a hole 414 through which the tube 410 projects. The tube 410 projects through the cap 412 to provide access to the liquid contents of a bottle even when the cap 412 is mounted to the bottle to seal the opening of the bottle.

In the illustrated embodiment, each slot 406 has a bayonet-style shape that includes linear receiving segment 416 and a transverse segment 418. The linear receiving segment 416 extends from the distal edge 132 to the transverse segment 418. The transverse segment 418 extends in a different direction than the linear receiving segment 416 and is shaped to retain the corresponding tube 410 within the slot 406. For example, the transverse segment 418 in the illustrated embodiment is at least partially curved. When the tube 410 is loaded into the slot 406 and advanced along the path of the slot 406 to an interior end 420 thereof, a peninsular (or promontory) portion 422 of the shelf 124 engages the tube 410 to retain the tube 410 in the slot 406. The peninsular portion 422 of the shelf 124 is defined by the shape and path of the slot 406. The slots 406 may be useful for keeping the tubes 410 extending from the caps 412 both organized and untangled.

The rack 100 according to the various embodiments described herein can be used in a chemical application, such as for analytical chemistry, but also could be used in other types of applications for at least temporarily holding and supporting reclosable container caps or lids, such as in kitchens, mechanic garages, pharmacies, and/or the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments and are merely example embodiments. Other embodiments and modifications may be apparent to those of ordinary skill in the art upon reviewing the above description. As used herein, the terms "including" and "in which" are used as the plain-English equivalents of the respective terms "comprising" and "wherein." Moreover, terms such as "first," "second," "third," "upper," "lower," "bottom," "top," etc. are used merely as labels, and are not intended to impose numerical or positional requirements on their objects.

What is claimed is:

1. A rack to be suspended from a support structure, the rack comprising:
a hook portion defining a cavity configured to receive an upper edge of a wall of the support structure therein;
an upright wall connected to and extending from the hook portion; and
a shelf connected to the upright wall at a location spaced apart from the hook portion along a height of the upright wall, the shelf projecting outward from the upright wall to a distal edge of the shelf that is spaced apart from the upright wall, wherein the shelf extends a width from the upright wall to the distal edge and extends a length perpendicular to the width between first and second ends of the shelf,
wherein the shelf defines a plurality of slots through the shelf and a plurality of apertures through the shelf, the slots open along the distal edge and arranged in a first row along the length of the shelf, the apertures arranged in a second row along the length of the shelf, the second row disposed between the first row and the upright wall,
wherein the apertures have rectangular shapes and a long dimension of each of the apertures is less than a diameter of a reclosable container cap configured to be received in the respective aperture, and a short dimension of each of the apertures is greater than a height of the reclosable container cap from a bottom end thereof to the top end thereof,
wherein at least two of the slots have a bayonet-style shape that includes a linear receiving segment and a transverse segment, the linear receiving segment extending from the distal edge, the transverse segment extending from the linear receiving segment and shaped to retain a tube that is connected to the reclosable container cap, the linear receiving segments being narrower than the apertures along the length of the shelf.

2. The rack of claim 1, wherein the hook portion, the upright wall, and the shelf are integrally connected to one another and define a unitary, monolithic body.

3. The rack of claim 1, wherein the shelf is planar along an entirety of the width from the upright wall to the distal edge such that the slots are coplanar with the apertures.

4. The rack of claim 1, wherein the linear receiving segments of the slots extend parallel to each other towards the upright wall.

5. The rack of claim 1, wherein a thickness of the shelf and a thickness of the upright wall are each less than 5 mm.

6. The rack of claim 1, wherein the hook portion includes a shoulder and a lip, the shoulder connected to both the upright wall and the lip and disposed between the upright wall and the lip, wherein the cavity is laterally defined between the upright wall and the lip, and the shoulder defines a closed top end of the cavity.

7. The rack of claim 6, wherein the lip includes one or more fitting elements coupled to the lip and projecting from an inner surface of the lip into the cavity, the one or more fitting elements configured to mechanically contact the wall of the support structure that is received within the cavity to secure the hook portion on the wall of the support structure.

8. The rack of claim 1, wherein the transverse segment extends along a curved path from the linear receiving segment to an end of the respective slot, the curved path defined by a peninsular portion of the shelf.

9. A rack to be suspended from a support structure, the rack comprising:
a hook portion defining a cavity configured to receive an upper edge of a wall of the support structure therein;
an upright wall connected to and extending from the hook portion; and
a shelf connected to the upright wall at a location spaced apart from the hook portion along a height of the upright wall, the shelf projecting outward from the upright wall to a distal edge of the shelf that is spaced apart from the upright wall, wherein the shelf extends a width from the upright wall to the distal edge and extends a length perpendicular to the width between first and second ends of the shelf,
wherein the shelf defines a plurality of slots through the shelf and a plurality of apertures through the shelf, the slots open along the distal edge and arranged in a first row along the length of the shelf, the apertures arranged in a second row along the length of the shelf, second row disposed between the first row and the upright wall along the width of the shelf,
wherein the apertures have rectangular shapes and a long dimension of each of the apertures is less than a diameter of a reclosable container cap configured to be received in the respective aperture, and a short dimension of each of the apertures is greater than a height of the reclosable container cap from a bottom end thereof to the top end thereof,
wherein at least one of the slots has a bayonet-style shape that includes a linear receiving segment and a transverse segment, the linear receiving segment extending from the distal edge to the transverse segment, the transverse segment extending along a curved path from the linear receiving segment to an end of the respective slot.

10. The rack of claim 9, wherein the shelf is planar along an entirety of the width of the shelf from the upright wall to the distal edge such that the slots are coplanar with the apertures.

* * * * *